United States Patent [19]

Kawaba

[11] Patent Number: 6,038,391
[45] Date of Patent: Mar. 14, 2000

[54] METHOD AND APPARATUS FOR EVALUATING PERFORMANCE OF MULTI-PROCESSING SYSTEM AND MEMORY MEDIUM STORING PROGRAM FOR THE SAME

[75] Inventor: Motoyuki Kawaba, Kawasaki, Japan

[73] Assignee: Fujitsu Limited, Kawasaki, Japan

[21] Appl. No.: 09/037,850

[22] Filed: Mar. 10, 1998

[30] Foreign Application Priority Data

Sep. 22, 1997 [JP] Japan ................................ 9-257129

[51] Int. Cl.⁷ ............................. G06F 11/34; G06F 11/30
[52] U.S. Cl. ............................... 395/500.42; 395/500.43
[58] Field of Search ...................... 395/500.44, 500.43, 395/500.48, 500.46; 710/52; 714/45, 39, 47, 27

[56] References Cited

U.S. PATENT DOCUMENTS

| | | | |
|---|---|---|---|
| 5,088,058 | 2/1992 | Salsburg ................................. | 364/500 |
| 5,375,070 | 12/1994 | Hershey et al. ....................... | 709/224 |
| 5,450,349 | 9/1995 | Brown, III et al. .................... | 714/27 |
| 5,572,672 | 11/1996 | Dewitt et al. .......................... | 714/47 |
| 5,608,866 | 3/1997 | Horikawa .............................. | 714/39 |
| 5,715,435 | 2/1998 | Ikei ....................................... | 395/500.44 |
| 5,754,888 | 5/1998 | Yang et al. ............................ | 710/52 |

OTHER PUBLICATIONS

Article in Computer IEEE publication 0018–9162/95, pp. 30–36, Hank Jakiela, Nov. 1995 titled 'Perfromance visualization of a distributed system: A case study'.

Article in IEEE Proceedings of PDP '96, 1066–6192/96, pp. 243–250, Bolf Borgeest and Christian Rodel, 'Trace Analysis with a Relational Database System.

Article in ACM Sigmetrics, 1993 AMC 0–89791–581–X/93/0005/0146, pp. 146–157, Stephen Goldschmidt and John Hennessy, 'The Accuracy of Trace–Driven Simulations of Multiprocessors'.

Article in IEEE Proceeding of Mascots'96, 0–8186–7235–8/96, pp. 37–43, Flanagan, Nelson and Thompson, 'The Inaccuracy of Trace–Driven Sim Using Incompleter Multi-programming Trace Data'.

*Primary Examiner*—Kevin J. Teska
*Assistant Examiner*—Lonnie A. Knox

[57] ABSTRACT

The present invention provides an apparatus for evaluating the performance of an MP system which is configured, to simulate the MP system highly accurately and speedily, in such a way as to comprise: a trace-data sampling part for sampling execution-trace data for each processor; a trace-data conversion part for converting execution-trace data sampled for each processor by the trace-data sampling part, thus estimating substantial processing time in the processor; and a simulation part for performing simulation of the MP system based on the processing time estimated for each processor by the trace-data conversion part, in order to evaluate the performance of the MP system.

30 Claims, 17 Drawing Sheets

4A

6A

NA(n): n'TH NETWORK-ACCESS INSTRUCTION
INST : NA(n)-DEPENDENT INSTRUCTION
AT A SOLID CIRCLE (●)THERE OCCURS DEPENDENCY BETWEEN NA(n) AND INST.

< CASE WHERE NL(n)<I(n) >

< CASE WHERE NL(n)>I1(n) >

<CASE WHERE NL(n) > I1(n)>

METHOD AND APPARATUS FOR EVALUATING PERFORMANCE OF MULTI-PROCESSING SYSTEM AND MEMORY MEDIUM STORING PROGRAM FOR THE SAME

BACKGROUND OF THE INVENTION

1. Field of the Invention

The present invention relates to a method and an apparatus for evaluating the performance of multi-processing systems suited for use in the evaluation of a multi-processing system having a configuration that a plurality of processors capable of executing instructions in parallel are interconnected so as to be communicable with each other, and also to a memory medium storing a program for evaluating the same.

The performance of a multi-processing system (hereinafter called an MP system) significantly depends on the efficiency of communication among a plurality of processors or between a processor and a memory. Therefore, MP system performance is evaluated at various developing steps of design, architecture determining, tuning, etc.

To evaluate MP system performance, there are a number of methods available, from among which an appropriate one is selected in consideration of desired simulation accuracy and a simulation speed.

The present invention tries to reduce the cycle required to develop an MP system, by employing a trace-driven simulation method, which provides high simulation accuracy and a high simulation speed.

2. Description of the Related Art

In conventional trace-driven simulation for an MP system, hardware or software processing has been performed on processor-to-processor basis to sample execution-trace data of the time when communication between processors or between each of them and a memory (it may hereinafter be referred to as inter-processor communication) was carried out, based on which trace data thus sampled for each processor an MP system-dedicated simulator simulates the MP system.

This method can advantageously use trace data of actual programs, so as to verify patterns close to actual inter-processor communication as well as to perform simulation at a high speed because the trace data needs to be sampled only once.

A high accuracy simulation is expected in particular when the processors constituting the MP system are scalar processors which do not execute instructions in parallel.

If, however, each of the processors of an MP system is, for example, a super-scalar processor, which can execute a number of instructions in parallel, trace data may change dynamically because intra-processor processing proceeds even when inter-processor communication is under way.

Therefore, simulation of an MP system with trace data unchanged, may suffer from significant decreases in simulation accuracy.

If, on the other hand, a single processor-use simulator is used to improve latency between communication sections, by specifically sampling trace data for each processor in the simulation of the MP system, vast time is required for the simulation.

SUMMARY OF THE INVENTION

From the viewpoint of such subjects, it is an object of the present invention to provide a method and an apparatus for evaluating an MP system whereby performance of the MP system can be evaluated accurately and speedily by speedy and accurate simulation and also to provide a memory medium which stores a program for evaluating the performance of the MP system which are executed in a computer to evaluate the MP system performance.

A multi-processing system performance evaluation method according to the present invention is thus used to evaluate the performance of an MP system that comprises a plurality of processors each of which can execute a number of instructions in parallel and which are interconnected so as to be communicable to each other. The method features that it samples execution-trace data from each processor and, based on the trace data, estimates a processing time in each processor and then, based on the estimated time, simulates the MP system, based on the results of which simulation the performance of the MP system is evaluated.

Again, a method according to the present invention features trace-driven simulation whereby time required to perform processing is calculated on the basis of execution-trace data sampled for each processor.

The method according to the present invention features also that the processing time is estimated as a plurality of time intervals. A sum of the time intervals is equal to an interval which spans time from a point of time when a data-access instruction for commanding data access occurs, where communication time required for the data access is assumed to be zero, to a point of time when the next data-access instruction occurs.

Specifically, the method features that an estimate of the plurality of time intervals comprises two time intervals: a first time interval I1 which spans time from a point of time when the data-access occurs to a point of time when dependency occurs between the data-access instruction and a processing instruction for commanding to process in the processor; and a second time interval I2 which spans time from that point of time when that dependency occurs to a point of time when the next data-access instruction occurs.

The method according to the present invention also features that if time required to communicate data access, which was assumed to be zero earlier, in the simulation of the MP system, is supposed to be NL, actual communication time required for the data access is calculated, on the basis of the above-mentioned first and second intervals I1 and I2, as follows:

max(NL, I1)+I2

The method according to the present invention also features that time when the next data-access instruction occurs is calculated on the basis of the above-mentioned actual communication time in the simulation of the MP system.

Moreover, an apparatus according to the present invention is used to evaluate the performance of an MP system that comprises a plurality of processors each of which can execute a number of instructions in parallel and which are interconnected to be communicable to each other, featuring a construction that comprises a trace-data sampling part which samples execution-trace data for each processor; a trace-data conversion part which converts thus sampled execution-trace data in order to estimate processing time in the processor; and a simulation part which simulates the MP system based on thus estimated processing time in order to evaluate the performance of the MP system.

The trace-data conversion part features its configuration as a simulator which converts, by use of trace-driven simulation, execution-trace data sampled for each processor, to calculate processing time.

The trace-data conversion part also features that processing time is estimated as a plurality of time intervals. A sum of the time intervals is equal to an interval which spans time from a point when a data-access instruction for commanding data access occurs, where communication time required for the data access is assumed to be zero, to a point of time when the next data access occurs.

Specifically, the trace-data conversion part features that it estimates two different time intervals: a first time interval I1 from a time point when the data-access instruction occurs to a point of time when dependency occurs between the data-access instruction and a processing instruction for commanding to process in the processor; and a second time interval I2 from the time point when the dependency occurs to a time point when the next data-access instruction occurs.

The simulation part features that actual communication time required for data access is calculated by the following expression, based on communication time which was supposed to be zero and then supposed to be NL earlier and the above-mentioned first and second time intervals I1 and I2:

$$\max(NL, I1)+I2$$

The simulation part features also that time when the above-mentioned next data-access instruction occurs is calculated on the basis of the above-mentioned actual communication time.

Also, a memory medium according to the present invention stores the program with which a computer can evaluate the performance of an MP system that comprises a plurality of processors each of which can execute a number of instruction in parallel and which are interconnected so as to be communicable to each other, specifically featuring that the performance-evaluation program permits the computer to have functions respectively as: trace-data sampling means which samples execution-trace data from each processor; trace-data conversion means which converts the above-mentioned execution-trace data for each processor, to estimate processing time required in the processor; and simulation means which simulates the MP system, for evaluation of its performance, based on the above-mentioned processing time estimated for each processor.

Thus, the performance-evaluation program features that the computer functions as a simulator that calculates processing time by converting, by means of trace-driven simulation, execution-trace data sampled for each processor, in order to operate the computer as the trace-data conversion means.

Also, the performance-evaluation program also feature that the trace-data conversion means acts in such a way that the processing time is estimated as a plurality of time intervals. A sum of the time intervals is equal to an interval which spans a time lapse from a time point when a data-access instruction for commanding data access occurs, where communication time required for data access is assumed to be zero, to a time point when the next data-access instruction occurs.

Specifically, the performance-evaluation program features that the trace-data conversion means acts in such a way as to estimate two different time intervals: a first time interval I1 from a time point when the data-access instruction occurs to a time point when dependency occurs between the data-access instruction and a processing instruction for commanding to process in the processor; and a second time interval from the above-mentioned time point for dependency to a time point when the above-mentioned next data-access instruction occurs.

Also, the performance-evaluation program features that the simulation means acts in such a way as to calculate, by the following expression, actual communication time for data access based on time NL required for data access, which has been assumed to be zero, and the above-mentioned time intervals I1 and I2:

$$\max(NL, I1)+I2$$

The performance-evaluation program features also that the simulation means acts in such a way as to calculate time when the above-mentioned next data-access instruction occurs, on the basis of the above-mentioned actual communication time.

Therefore, the present invention provides an advantage that it is possible to evaluate very accurately and speedily the performance of an MP system that comprises a plurality of processors each of which can execute a number of instructions in parallel, by using execution-trace data sampled for each processor in order to estimate processing time for the processor. Thus, the cycles for developing the MP system can be reduced, decreasing the man-power requirements for MP system development.

DESCRIPTION OF THE PREFERRED EMBODIMENTS

The embodiments of the present invention are described below with reference to the accompanying drawings.

(a) Description of One Embodiment

Figure 1:
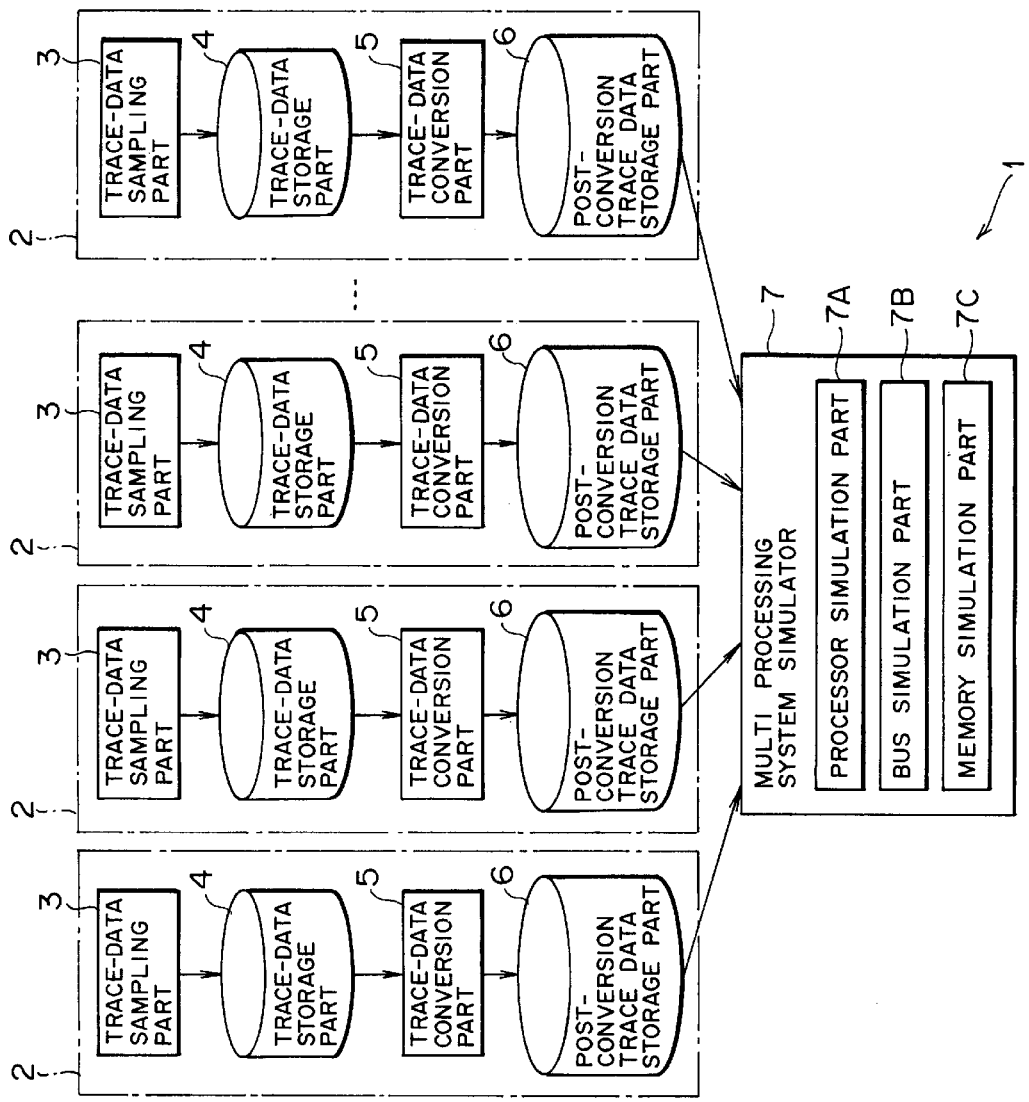
FIG. 1 is a block diagram of a configuration of an apparatus related to an embodiment of the present invention for evaluating the performance of an MP system.

FIG. 1 is a block diagram illustrating a configuration of an apparatus (hereinafter called MP system-performance evaluation apparatus 1 in some cases) related to one embodiment of the present invention for evaluating the performance of an MP system.

Figure 2:
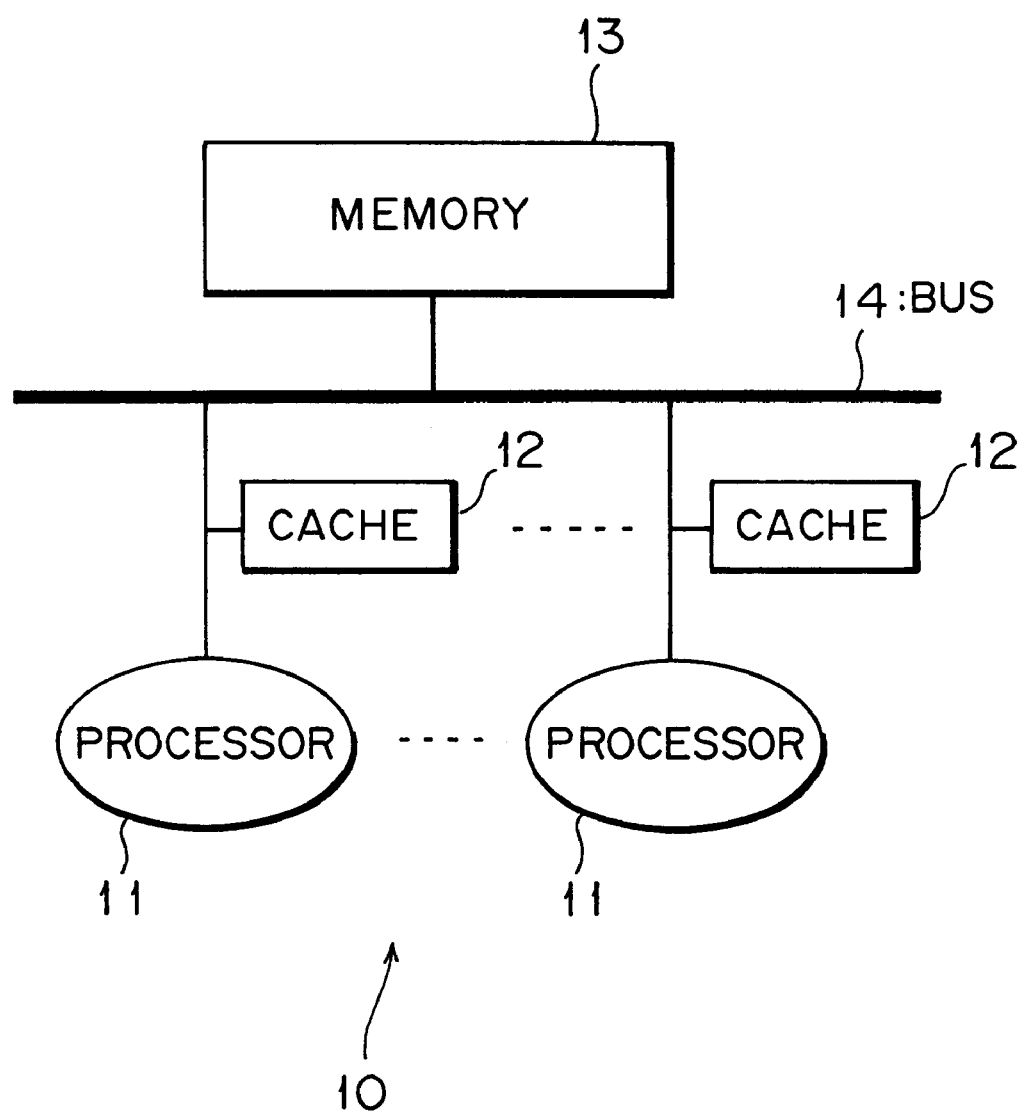
FIG. 2 is a block diagram of an exemplary configuration of an MP system.

As seen from FIG. 2 which shows an example of an MP system, in which an MP system 10 comprises a plurality of (two here) processors 11 each of which can execute a number of instruction in parallel and is connected to the other processors via a bus 14. Via the bus 14 is also connected a memory 13 with the processors 11 for shared use by them. The processors each have cache. The processors 11 have also a peripheral controller (I/O).

First, the above-mentioned trace-driven simulation is described as follows. It should be noted that trace-driven simulation uses as an actual simulation input an execution hysteresis (trace data) of a system.

That is, trace-driven simulation uses trace data sampled in one system (hardware/software), to evaluate and predict the performance of other systems (hardware/software).

Therefore, traced-driven simulation may be said to be simulation on the assumption that "the execution sequence stays unchanged in different systems."

Traced-driven simulation has the following advantages:
(i) The behavior of target programs can be evaluated and predicted by using trace data as an input; and
(ii) Target programs need not be executed in simulation, thus enabling high-speed evaluation and prediction of the performance.

An MP-performance evaluation apparatus 1 shown in FIG. 1 comprises a plurality of single-processor simulators 2 and an MP-system simulators 7.

The number of single-processor simulators 2 (hereinafter called SP simulator 2 in some cases) corresponds to the number of processors 11 in order to simulate the processors 11 in parallel. Each of the SP simulators 2 has a trace-data sampling part 3; a trace-data storage part 4; a trace-data conversion part 5; and a post-conversion trace data storage part 6.

The trace-data sampling part 3 samples execution-trace data by each of the processors 11.

Although various types of trace data is generally used to evaluate the performance of an MP system, the present embodiment describes a case where instruction-trace data and address-trace data are used, i.e. a case where the trace-data sampling part 3 samples instruction-trace data and address-trace data for each processor 11.

Instruction-trace data comprises a plurality of instruction strings arranged in order they have been actually executed and is to be used for pipeline simulation of the processors 11.

Address-trace data comprises a plurality of addresses arranged in order they have been accessed when they were used by a LOAD/STORE or any other memory-access instruction and is to be used for simulation of the cache 12. The address-trace data is generally provided with the information of a type (LOAD/STORE) of an instruction whose address was accessed.

The trace-data sampling part 3 is adapted to sample as trace data, not as original trace data, a mixture of instruction-trace data and address-trace data.

Figure 4:
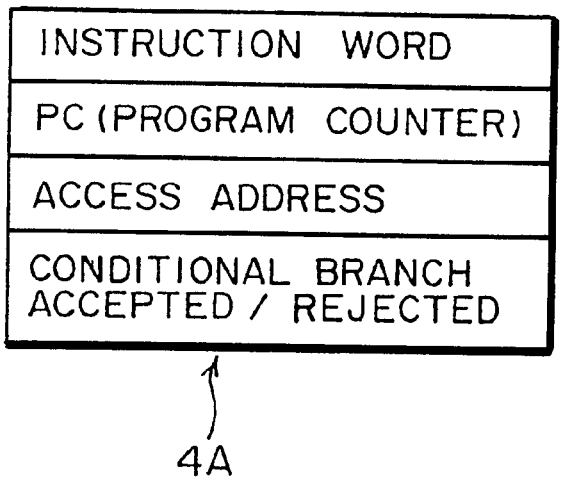
FIG. 4 illustrates a configuration of pre-conversion trace data.

An example of the configuration of the trace data (pre-conversion trace data) is shown in FIG. 4, in which each trace data 4A comprises an "instruction word," a "PC (program counter)," an "access address," and information about "conditional branch accepted/rejected." The "instruction word" represents an instruction executed, "PC" represents the address of an instruction executed, "access address" represents the address accessed, in which the values of only the LOAD and STORE instructions are written, and "conditional branch accepted/rejected" represents the address accessed, in which the values of only the conditional-branch instructions are written.

The trace-data storage part 4 stores execution-trace data 4A sampled for each processor 11 by the trace-data sampling part 3.

The trace-data conversion part 5 also converts the execution-trace data 4A sampled for each processor 11 by the trace-data sampling part 3, thus estimating processing time in the processor 11.

That is, in the present embodiment, the trace-data conversion part 5 is configured as a simulator for single processor that calculates processing time in the processor 11 by converting, by trace-driven simulation, the execution-trace data 4A sampled for each processor.

The trace-data conversion part 5 here is configured, as detailed later, in such a way that the processing time is estimated as a plurality of time intervals. A sum of the time intervals is equal to an interval between time when a data-access instruction for commanding data access occurs, where communication required for the data access is assumed to be zero, and time when the next data-access instruction occurs.

In other words, the trace-data conversion part 5, also detailed later, is configured in such a way that said plurality of time intervals consist of two time intervals: a first time interval I1 from time when the data-access instruction occurs to time when dependency occurs between the data-access instruction and a processing instruction for commanding to process in the processor 11; and a second time interval from time when dependency occurs between the data-access instruction and the processing instruction to time when the next data access instruction occurs.

Figure 5:
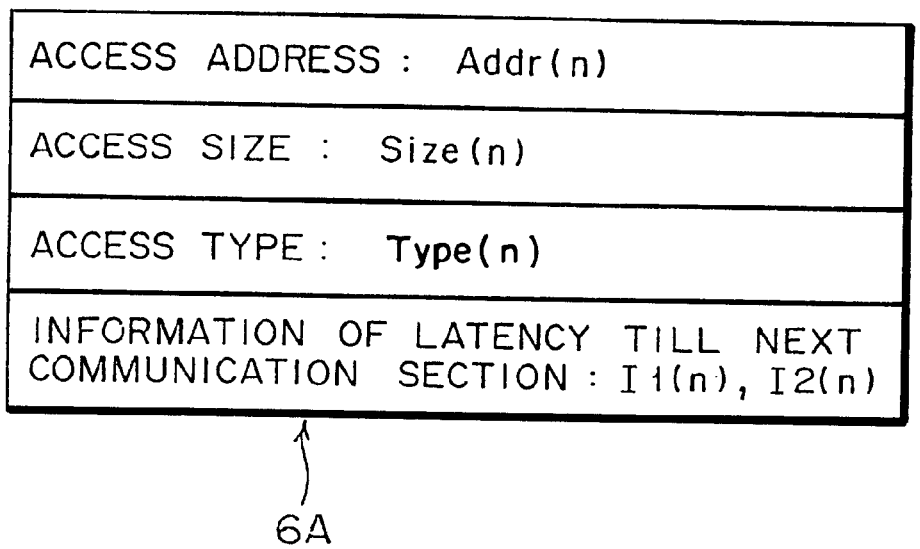
FIG. 5 illustrates a configuration of post-conversion trace data.

The configuration of the trace data converted by the trace-data conversion part 5 (post-conversion trace data) is shown in FIG. 5.

Post-conversion trace data 6A comprises, as shown in FIG. 5, an "access address [Addr8n)]," an "access size [Size (n)]," an "access type [Type (n)]," "information about latency till next communication section [I1(n), I2(n)]." The "access address" represents an address to be accessed in the memory 13, the "access size" represents the size of data to be accessed, and the "access type" represents the type of an access instruction (READ/ WRITE/ REPLACE/ LOCK/ UNLOCK, etc.). The "information about latency till next communication section" is information about the execution time between communication sections, i.e. between one [part performing (communication with other processors or memories)] and another, to which said I1(n) or I2(n) corresponds.

Also, the post-conversion trace data storage part 6 stores the post-conversion trace data 6A converted by the trace-data conversion part 5.

It should be noted here that a multi-processing system simulator 7 (hereinafter called an MP system simulator 7 in some cases) acts as a simulation part because it simulates the MP system 10 based on the above-mentioned processing time estimated for each processor 11 by the trace-data conversion part 5 of each SP simulator 2. The MP simulator 7, as detailed in FIG. 3, comprises: a processor simulator part 7A which simulates the processor 11; a bus simulation part 7B which simulates the bus 14; and a memory simulation part 7C which simulates the memory 13. Those simulation parts are each configured to simulate each of those components for each cycle.

Figure 3:
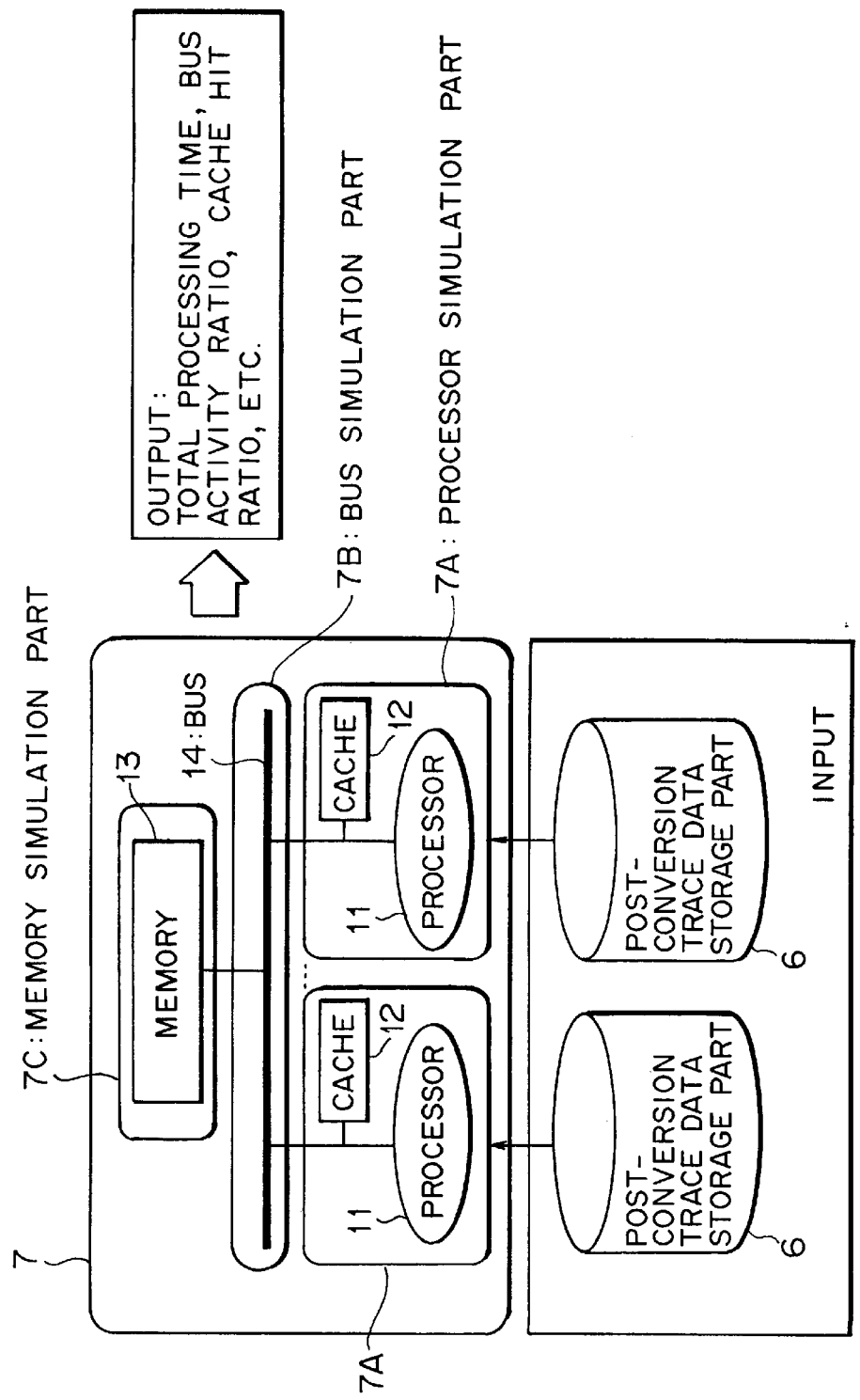
FIG. 3 is a block diagram of a configuration of an MP system simulator.

The MP system simulator 7, as shown in FIGS. 1 and 3, receives as an input the post-conversion trace data 6A, which is used in the processor simulation part 7A. The MP system simulation 7 may output total execution time, bus activity ratio, cache hit ratio, CPU processing time, etc.

The MP system simulator 7, as detailed later, is configured in such a way that the actual communication time required for data access is calculated by the following expression (1) based on time NL given as communication time required for data access which has been assumed to be zero and the above-mentioned first and second time intervals I1 and I2:

$$\max(NL, I1) + I2 \qquad (1)$$

Moreover, the MP system simulator 7 is configured, as detailed later also, so as to calculate the occurrence time for the above-mentioned next data access instruction based on the above-mentioned actual communication time.

Actually, in a performance-evaluation apparatus 1 related to the present embodiment for MP systems, the functions corresponding to the above-mentioned trace-data sampling part 3 and the trace-data conversion part 5 of an SP simulator 2 and also the MP system simulator 7 are realized as the actions of the processor circuits by writing a program (hereinafter called a program for evaluating the performance of MP systems, i.e. MP system-performance evaluation program) stored in a memory medium (not shown) such as disks or CD-ROMs in the computer into another memory medium (RAMs) not shown and also by activating the MP system-performance evaluation program and then executing them with processor circuits (the CPU etc.).

The MP system-performance evaluation program permits the computer to operate respectively as: a trace-data sampling part (trace-data sampling means) 3 which samples execution-trace data for each processor 11; a trace-data conversion part (trace-data conversion means) 5 which converts the execution-trace data sampled for each processor 11 by the trace-data sampling part 3, to estimate substantial processing time in the processor 11; and an MP system simulator (simulation means) 7 which simulates the MP system 10 based on the processing time estimated for each processor 11 by the trace-data conversion part 5.

It should be noted here that the MP system-performance evaluation program is stored in, for example, CD-ROMs etc. and, as required, installed from them into disks etc. of the computer and then used.

That is, the above-mentioned disk, CD-ROM, etc. corresponds to a memory medium which stores therein the performance-evaluation program for evaluating the performance of the MP system 10.

Also, as the trace-data storage part 4 and the post-conversion trace-data storage part 6, disks and memories (RAMs), both not shown, are used.

In the above-mentioned configuration, an MP system-performance evaluation apparatus 1 related to one embodiment of the present invention simulates the MP system 10 in such a way as described below, based on the results of which simulation the performance of the MP system 10 is evaluated.

The operations by the MP system-performance evaluation apparatus 1 are detailed below with reference to the flowcharts shown in FIGS. 6 through 14.

In the present embodiment, the above-mentioned trace-driven simulation is carried out based on the following assumptions. Those assumptions insure that no trace data other than communication sections changes with order in which various processings are performed by the processors 11.

(i) Assumption for Trace Data

Trace data has been sampled for each processor 11. A busy loop where shared variables are locked or unlocked is retained as an abstract instruction string, i.e. instructions to lock or unlock respectively.

It is thus possible to discriminate between shared variables which may be accessed from other processors 11 and local variables which can be accessed only from the concerned processor 11 itself.

(ii) Assumption of Behavior of Programs

The instruction words (execution-trace instruction strings) and the access addresses do not change with the behavior of the other processors 11.

Figure 6:
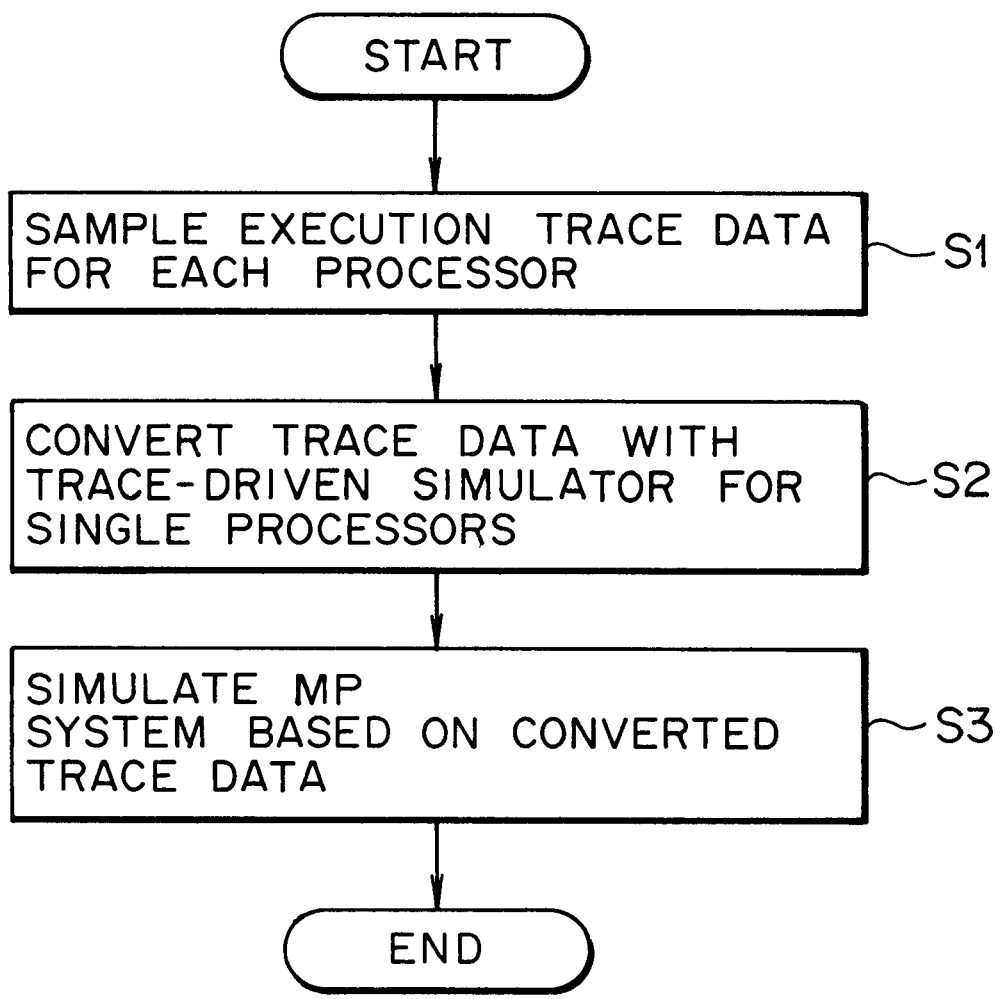
FIG. 6 is a flowchart illustrating the operation of an apparatus related to an embodiment of the present invention for evaluating the performance of an MP system.

Based on these assumptions, in an MP system-performance evaluation apparatus 1, the trace-data sampling part 3 of SP simulator 2 samples execution-trace data for each processor 11 (step S1 in FIG. 6).

Subsequently, the trace-data conversion part 5 of SP simulator 2 estimates processing time in the processor 11 based on the above-mentioned execution-trace data sampled for the processor 11 (step S2 in FIG. 6). The above-mentioned processing time is calculated by trace-driven simulation based on the execution-trace data 4A sampled for each processor 11.

At the trace-data conversion part 5, post-trace data 6A is created for each inter-processor communication. The trace-data conversion part 5 is provided to each SP simulator 2, so that all trace data pieces can be converted concurrently as required.

To analyze trace data, it is necessary to pay attention to all memory accesses concerning network traffic. With this, inter-processor communication is to be conducted in the following cases:

(i) Access to shared variables (LOAD/STORE/REPLACE)

Figure 9:
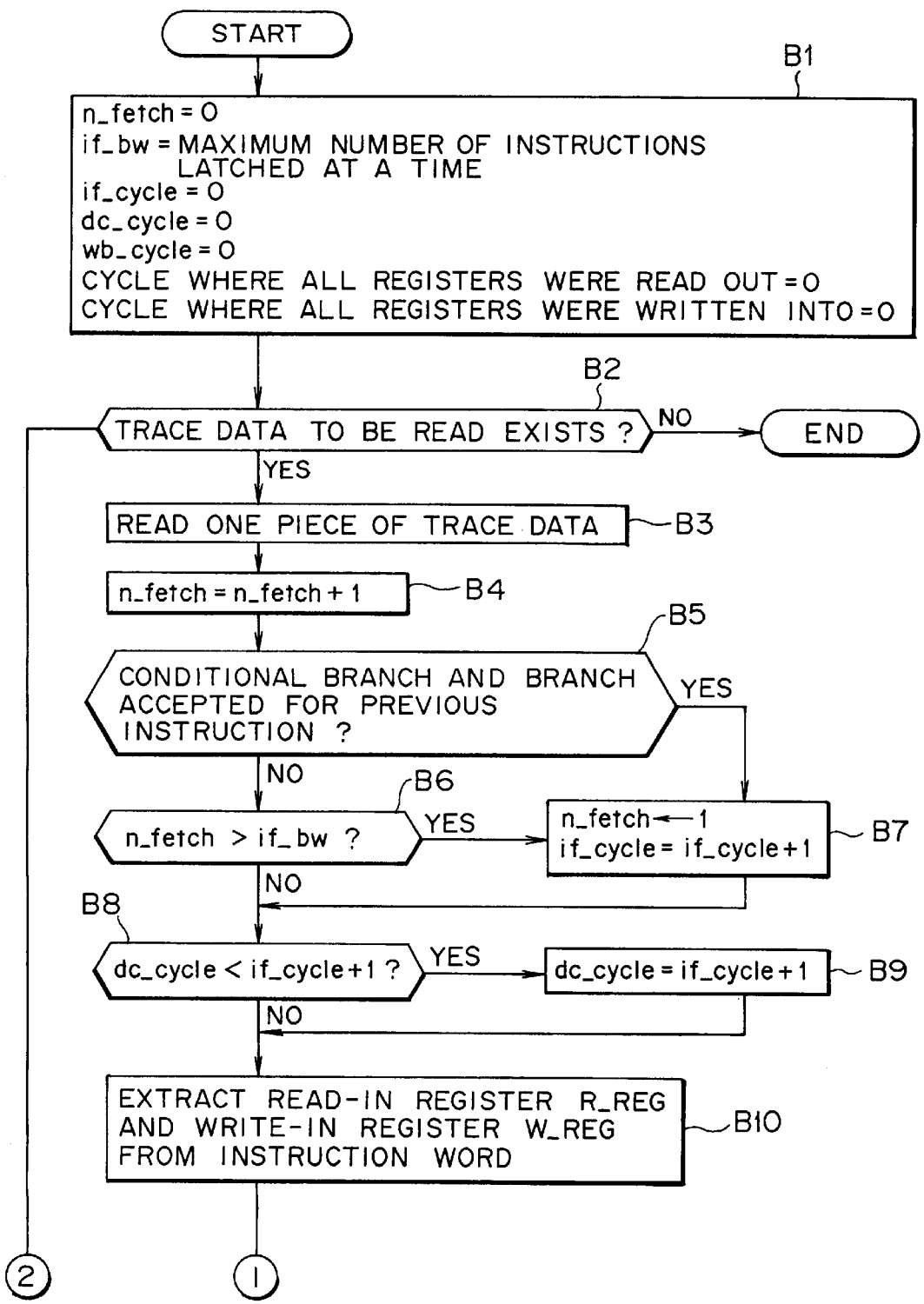
FIG. 9 is a flowchart illustrating the operation of an apparatus related to an embodiment of the present invention for evaluating the performance of an MP system.
Figure 10:
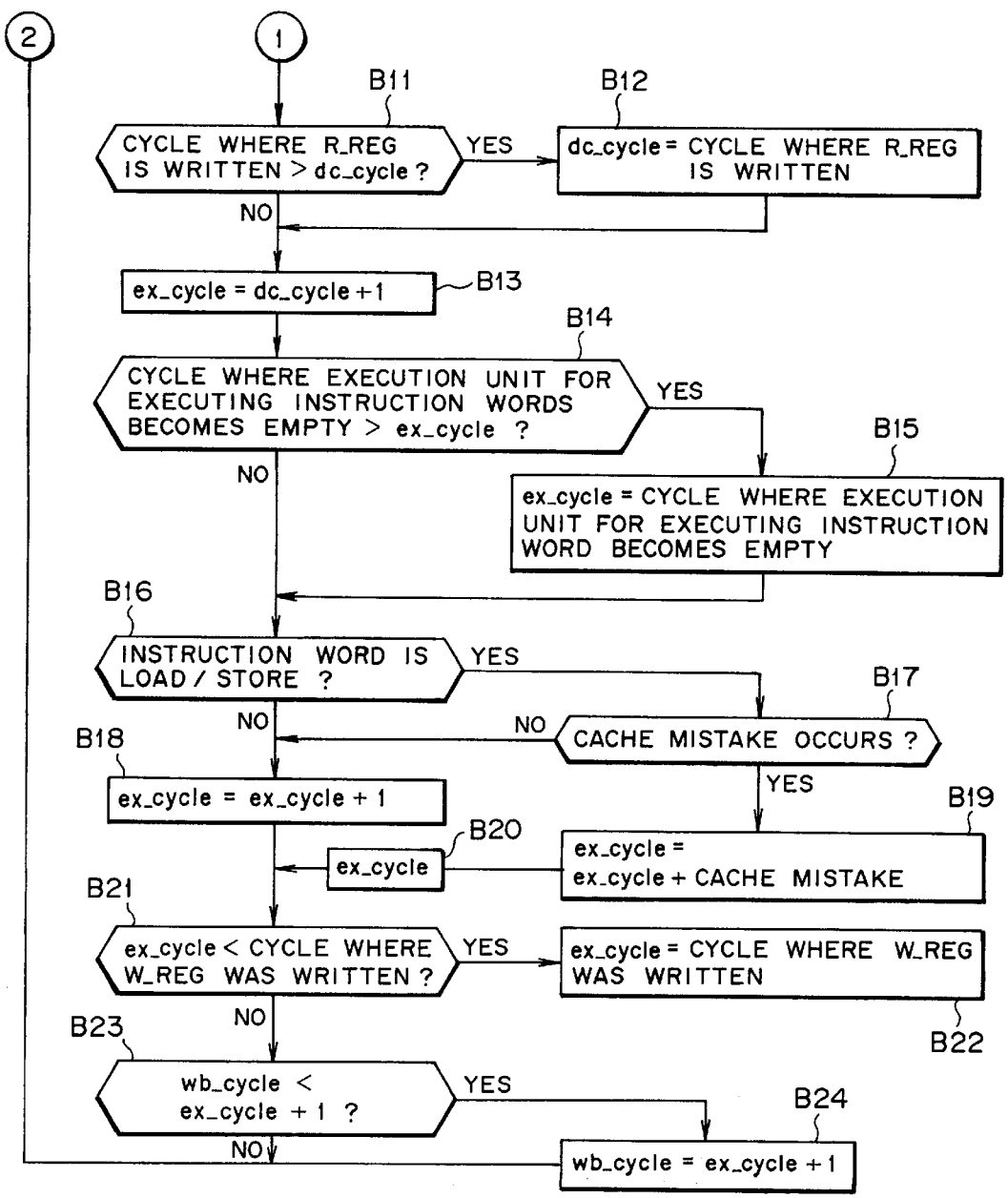
FIG. 10 is a flowchart illustrating the operation of an apparatus related to an embodiment of the present invention for evaluating the performance of an MP system.

(ii) External cache misses, including cache replacing, in access to local variables An example of evaluation of processors 11 by use of trace-driven simulation is shown in FIGS. 9 and 10. The present embodiment is described about a case where the value of a program counter (see FIG. 4) for the pre-conversion trace data 4A is not used.

First, a processor 11 having such a simple pipeline as shown below is simulated (see steps B1 through B10 in FIG. 9 and steps B11 through 24 in FIG. 10).

(i) Usual instruction; FDEW (ii) Memory access instruction: FDEMMW F, here, stands for fetch, D stands for decode, E stands for execute, W stands for writeback, and M stands for memory access.

The if cycle at step B8 in FIG. 9 tells the time of "fetch" and the dc cycle at step B13, ex cycle at step B16, and wb cycle at step B23 in FIG. 10 tell the time of "decode," the time of "execute," and the time of "writeback" respectively. Also, ex cycle at step B20 in FIG. 10 tells the time when memory access started and the wb cycle after all instructions are executed completely tells all execution time lapses.

Moreover, the trace-data conversion part 5 estimates the processing time as the time intervals I1(n) and I2(n) between time when the data-access instruction occurs and time when the next data-access instruction occurs in the case where the communication time required for data access is assumed to be zero, i.e. in the case where there is assumed no network latency.

I1(n) and I2(n) are here defined by the following expressions (2) and (3) in the case where the nth network-access instruction is assumed to be NA(n) and the depending instruction, INST(n):

$$I1(n)=[\text{time when dependency occurs between INST}(n) \text{ and } NA(n)]-[\text{time when } NA(n) \text{ started memory access}] \quad (2)$$

$$I2(n)=[\text{time when } NA(n+1) \text{ started memory access}]-[\text{time when dependency occurs between INST}(n) \text{ and } NA(n)] \quad (3)$$

In other words, I1(n) represents the first time interval from time when the data-access instruction occurs to time when dependency occurs between the data-access instruction and a processing instruction for commanding to process in the processor 11. I2(n), on the other hand, represents the second time interval from time when dependency occurs to time when the next data-access instruction occurs.

Figure 7:
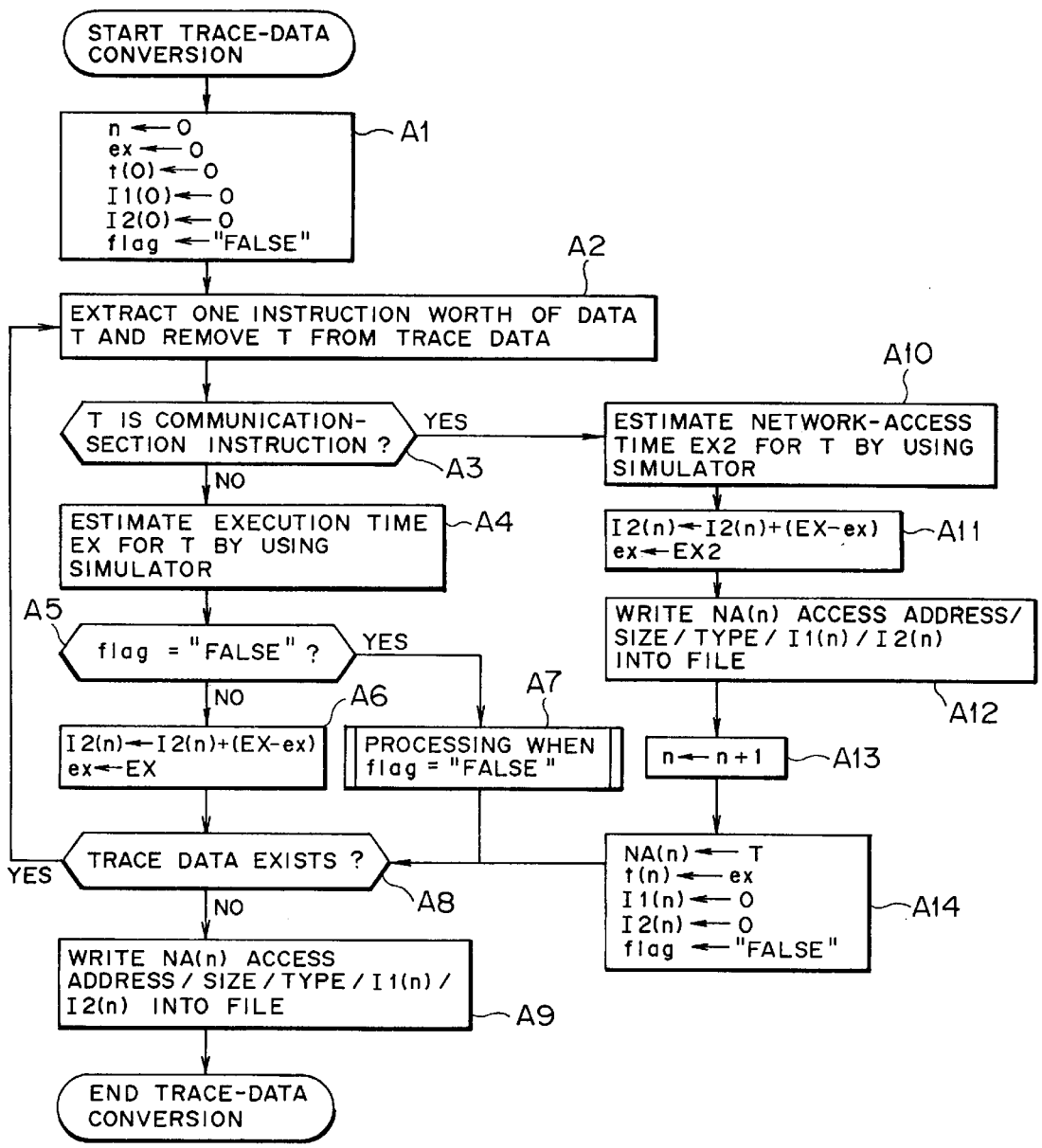
FIG. 7 is a flowchart illustrating the operation of an apparatus related to an embodiment of the present invention for evaluating the performance of an MP system.
Figure 8:
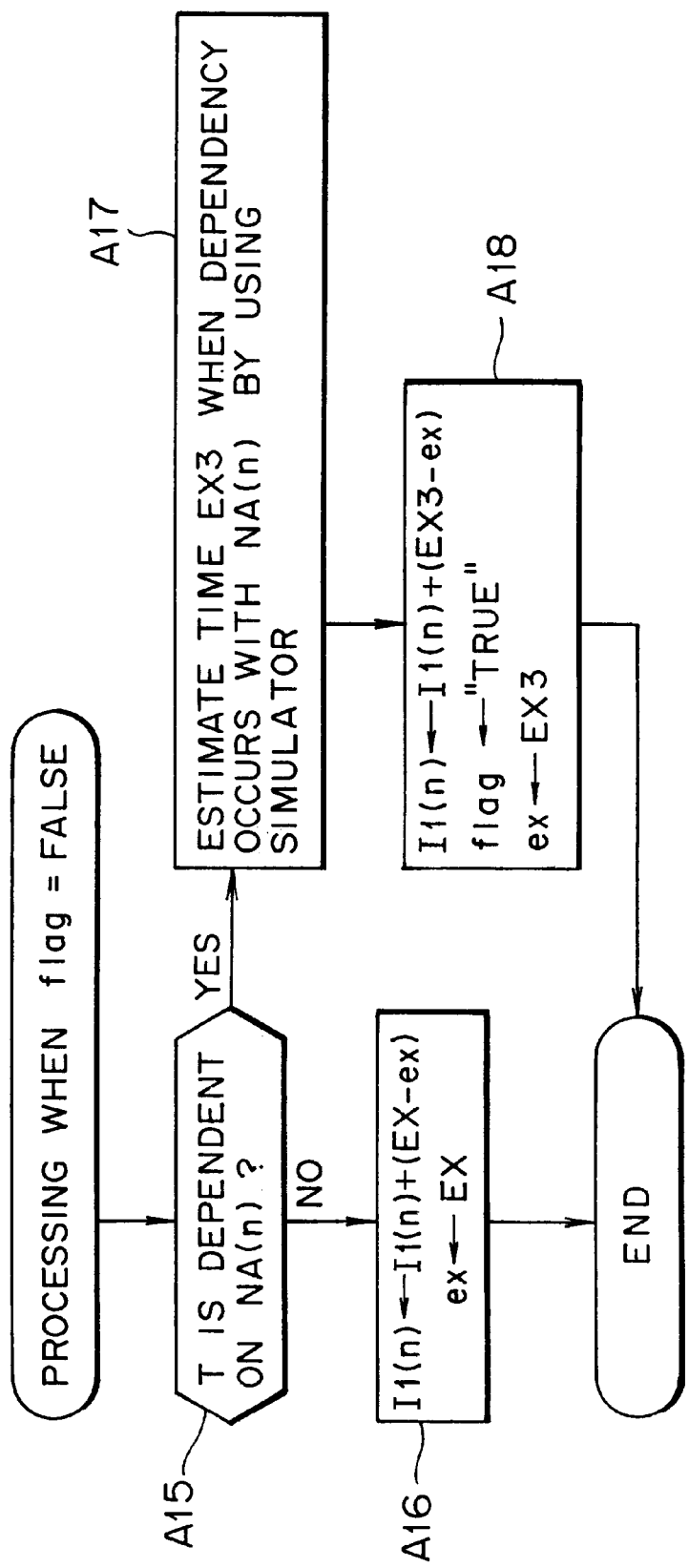
FIG. 8 is a flowchart illustrating the operation of an apparatus related to an embodiment of the present invention for evaluating the performance of an MP system.

A procedure for estimating latency between communication sections at the trace-data conversion part 5 is shown in FIGS. 7 and 8.

In a setting where no network latency (NL) is given, a single processor-use trace-driven simulator carries out simulation (see steps A1 trough A14 in FIG. 7 and steps A15 through A18 in FIG. 8), to obtain I1(n) and I2(n).

The dependency to be detected when I1(n) is obtained is shown below. The contents parenthesized below represent timing.

(i) In the case of LOAD
  Instruction in a true dependency with LOAD (stage of reading operands)
  Subsequent LOAD (MEMORY ACCESS)
  Subsequent STORE which causes memory interference (memory access)
(ii) In the case of STORE
  Subsequent STORE (memory access)
  Subsequent LOAD which causes memory interference (memory access)

Next, the MP system simulator 7 simulates the MP system 10 based on the processing time estimated for each processor 11 (step C3 in FIG. 6).

Figure 11:
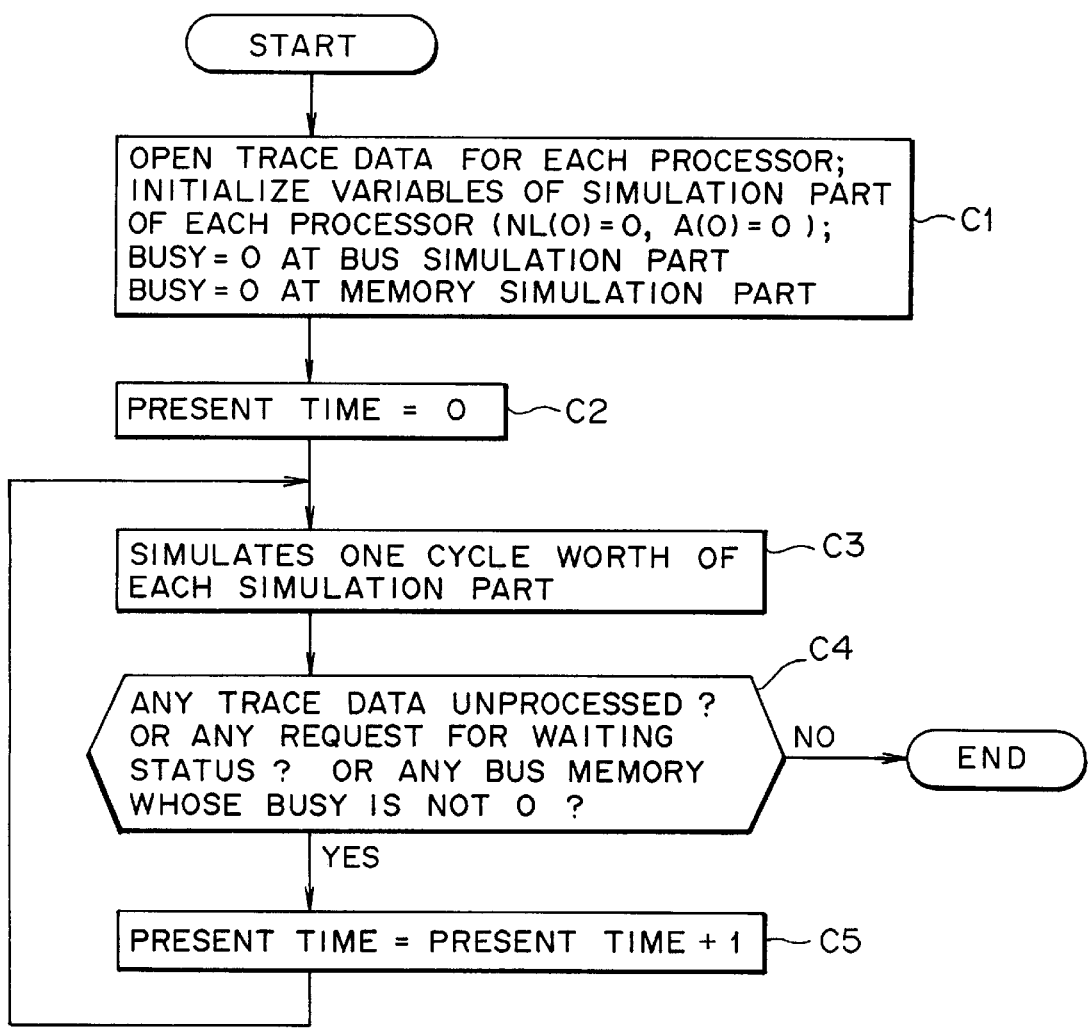
FIG. 11 is a flowchart illustrating the operation of an apparatus related to an embodiment of the present invention for evaluating the performance of an MP system.

The operation carried out by the MP system simulator as a whole is shown in FIG. 11.

First, the MP system simulator 7 reads in the post-conversion trace data 6A for each processor 11, to initialize the variable of each processor simulator part 7A and, at the same time, to set BUSY's of the bus simulation parts 7B and 7C to 0 (step C1 in FIG. 11) and also the present time to 0 (step C2 in FIG. 11).

Figure 12:
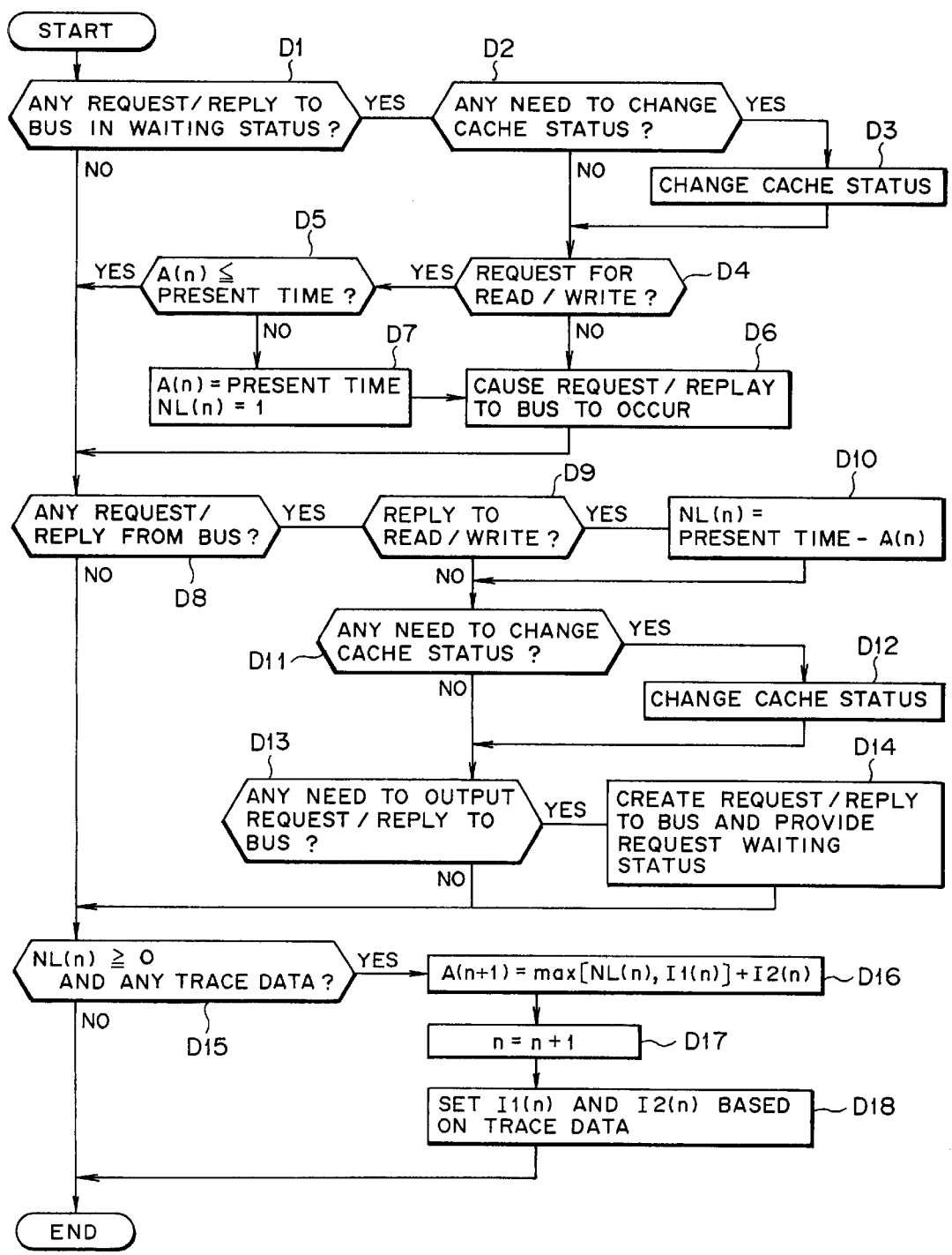
FIG. 12 is a flowchart illustrating the operation of an apparatus related to an embodiment of the present invention for evaluating the performance of an MP system.
Figure 13:
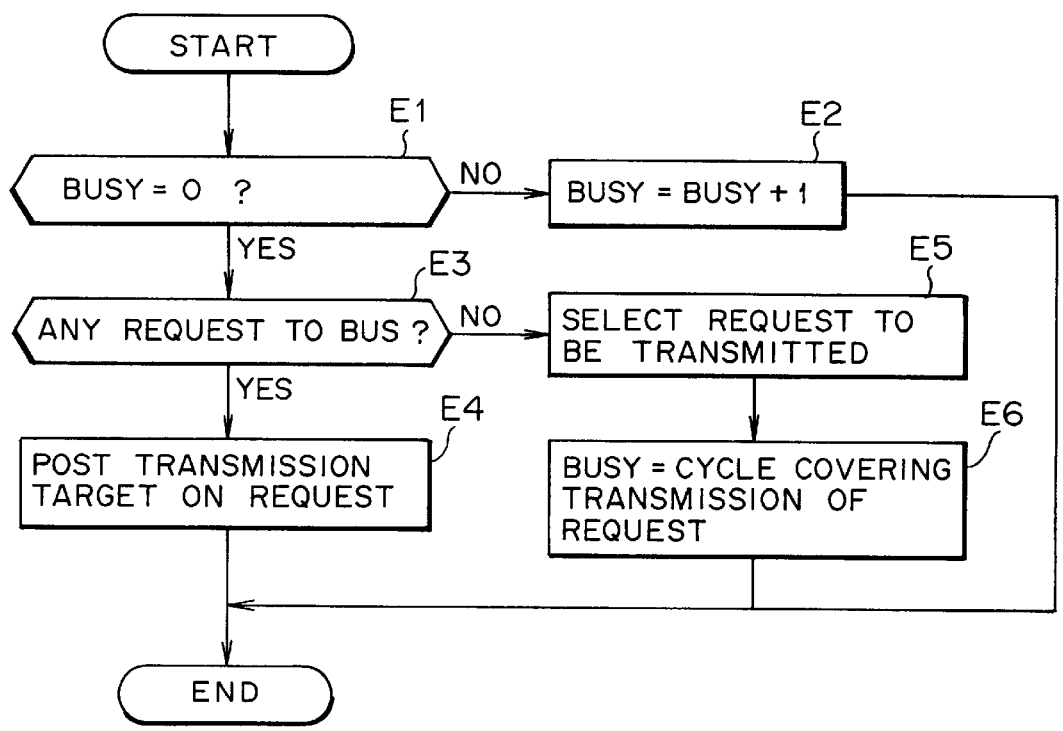
FIG. 13 is a flowchart illustrating the operation of an apparatus related to an embodiment of the present invention for evaluating the performance of an MP system.
Figure 14:
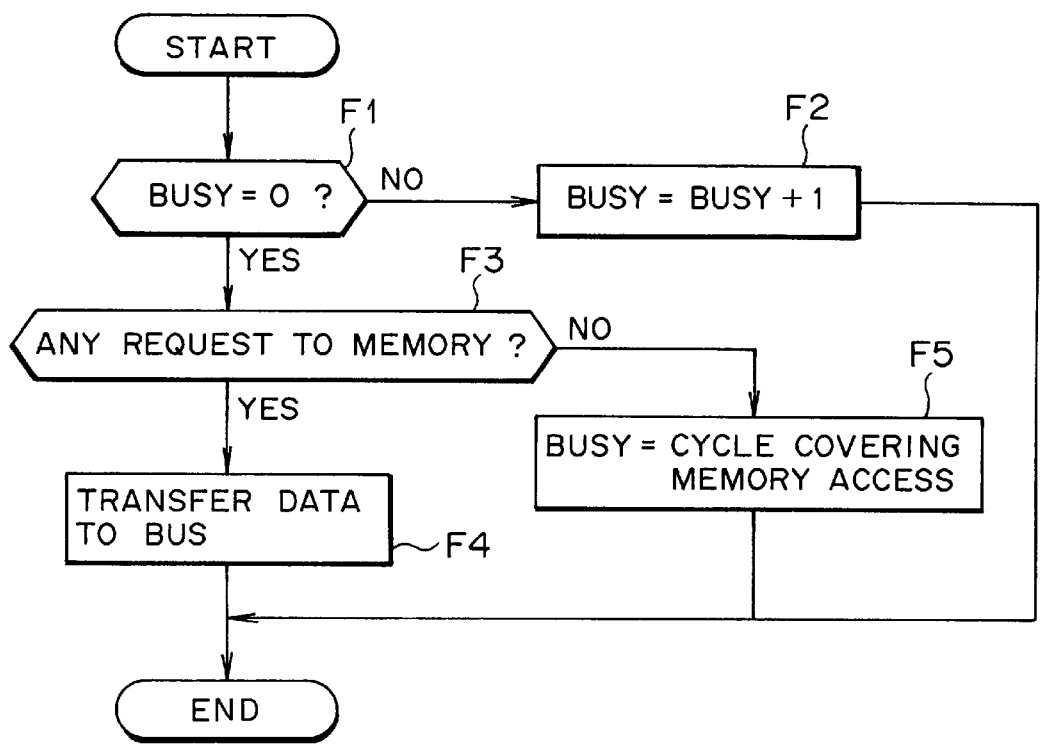
FIG. 14 is a flowchart illustrating the operation of an apparatus related to an embodiment of the present invention for evaluating the performance of an MP system.

Subsequently, the simulation parts 7A, 7B, and 7C simulate one cycle of components 11, 14, and 13 (step C3 in FIG. 11; i.e. steps D1 through D18 in FIG. 12, steps E1 through E6 in FIG. 13,A and steps F1 thorough F5 in FIG. 14). Here, FIG. 12 is a flowchart of one-cycle operation by the bus simulation part 7A, FIG. 13 is a flowchart of that by the bus simulation part 7B, and FIG. 14 is flowchart of that by the bus simulation part 7C.

Next, it is decided whether there is unprocessed post-conversion trace data 6A, whether there is a request in waiting status, or whether there is the bus 14 or the memory 13 whose BUSY is not 0 (step C4 in FIG. 11).

If it is decided so, the present time is incremented by 1 (YES route at step C4 through step C5 in FIG. 11);

otherwise, the simulation by the MP system simulator 7 is terminated.

Specifically, the processor simulation part 7A, for example, carries out simulation based on the post-conversion trace data 6A obtained by the trace-data conversion part 5 (steps D1 through D18 in FIG. 12).

The abbreviations used in the following description are explained as follows:

Trace(id): post-conversion trace data 6A of processor id (id: identification number)

I1(id,n): I1(n) for post-conversion trace data of processor id

I2(id,n): I2(n) for post-conversion trace data of processor id A(id,i): Time when the i'th communication section for processor id started, which is estimated by the MP system simulator 7

After the time at each processor 11 is initialized with I1(id,0), the processor simulation part 7A starts simulation.

If time NL is given as communication time required for data access whose time is assumed to be 0 before simulation, the actual communication time required for data access is calculated by the following expression (4) based on I1(id,n) and I2(id,n):

$$\max[NL, I1(id,n)]+\max[0, I2(id,n)] \quad (4)$$

Based on the actual communication time obtained by expression (4), the time when the next data-access instruction occurred is calculated.

That is, the processor simulation part 7A uses A(id,n), I1(id,n), and I2(id,n), to obtain timing A(id,n+1) when the (n+1)'th communication section starts, so that A(id,n+1) is obtained by the following expression (5) if processing time for NA(id,n) is NL(id,n). To calculate NL(id,n), the conventional method is employed as required.

$$A(id,n+1)=A(id,n)+\max[NL(id,n), I1(id,n)]+\max[0, I2(id,n)] \quad (5)$$

Immediately after the system time for simulation reached A(id,n+1), trace data is extracted form Trace(id), to apply MP simulation.

Figure 15:
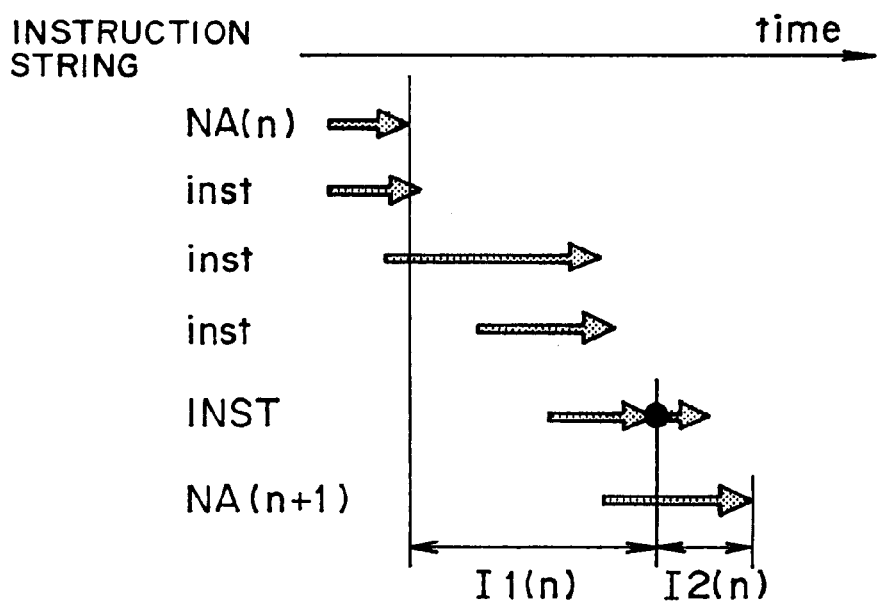
FIG. 15 is a diagram illustrating the operation of an apparatus related to an embodiment of the present invention for evaluating the performance of an MP system.
Figure 16:
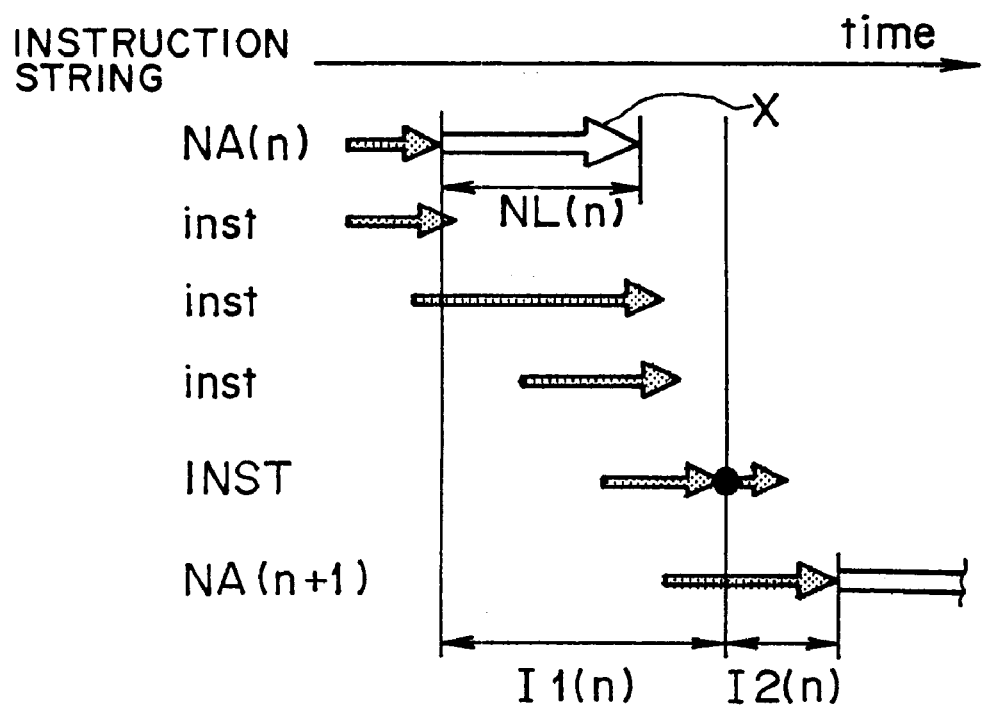
FIG. 16 is a diagram illustrating the operation of an apparatus related to en embodiment of the present invention for evaluating the performance of an MP system.
Figure 17:
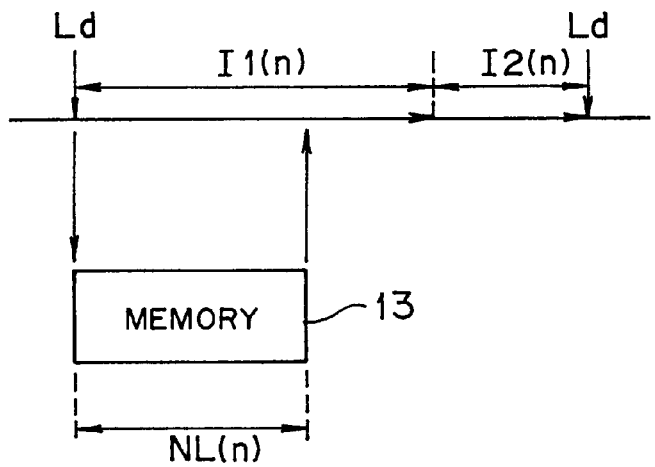
FIG. 17 is a diagram illustrating the operation of an apparatus related to an embodiment of the present invention for evaluating the performance of an MP system.
Figure 18:
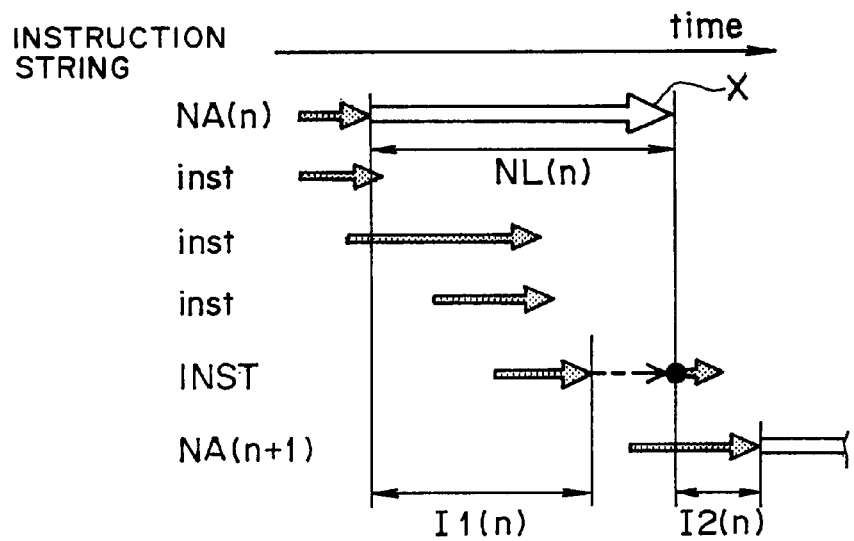
FIG. 18 is a diagram illustrating the operation of an apparatus related to an embodiment of the present invention for evaluating the performance of an MP system.
Figure 19:
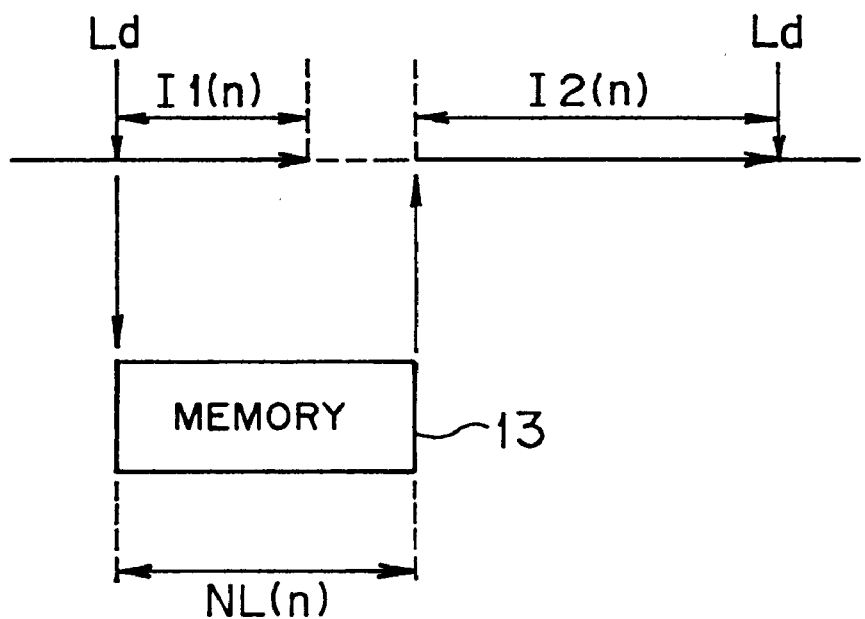
FIG. 19 is a diagram illustrating the operation of an apparatus related to an embodiment of the present invention for evaluating the performance of an MP system.

An example of calculating I1(n) and I2(n) by the trace-data conversion part 5 is shown in FIG. 15. In it, the horizontal axis represents time and the vertical axis, instruction string. Also, the length of right-ward heavily shaded arrow represents a time lapse for which each instruction is processed. An actual MP system 10, which has network latency NL(n) not being 0, involves a case where NL(n)<I1 (n) as shown in FIGS. 16 and 17 and also a case where NL(n)>I1(n) as shown in FIGS. 18 and 19. The right-ward bold blank arrow X in FIGS. 16 and 18 represents NL(n).

Since NA(n)-dependent instruction INST cannot be processed prior to the completion of NA(n) execution, the timing at which INST is processed is given by the following expression (6):

$$T=A(id,n)+\max[NL(id,n), I1(id,n)] \quad (6)$$

As many as I2(n) cycles after the processing of INST started, NA(n+1) executes communication sections. Therefore, the following expression (7) is obtained:

$$A(id,n+1)=T+\max[0, I2(id,n)] \quad (7)$$

In other words, the MP system simulator 7 estimates the communication-section starting timing using the above-mentioned expressions (6) and (7).

In this estimating, the present embodiment can carry out simulation in the processor 11 completely independently and, moreover, at a high speed because simulation need not be performed again in the processor 11 once trace data is converted.

Finally, the performance of the MP system 10 is evaluated on the basis of the results of the simulation by the MP system simulator 7.

Thus, by a performance-evaluation apparatus for MP systems related to one embodiment of the present invention, it is possible to use the execution-trace data 4A sampled for each processor 11 in order to estimate processing time in the processor [i.e., divide a communication-section interval into I1(n) and I2(n) and retain them], thereby simulating and evaluating, highly accurately and speedily, the performance of an MP system which comprises a plurality of processors each of which can execute a number of instructions in parallel.

The development cycle for MP systems can thus be reduced, thus decreasing the man-power requirements for the development of the MP systems.

(b) Others

One important aspect for the evaluation of MP system performance is the estimating of increases in traffic by a cache protocol, simulation of which protocol, however, requires information of the state of the cache in the communication section.

With this, the MP system simulator 7 may comprise a cache simulation part which reproduces the cache state at the time of communication section based on the post-conversion trace data 6A. That is, the post-conversion trace data 6A includes not only READ/WRITE access information but also REPLACE information, thus enabling the cache simulation part to reproduce the cache state.

The MP system simulator 7 may also comprise a spin-lock simulation part which simulates increases in the number of communication sections performed caused by spin lock or cache coherence.

In such a way, the MP system simulator 7 can be used to perform more accurate simulation.

What is claimed is:

1. A method for evaluating performance of an MP system that comprises a plurality of processors which are interconnected so as to be communicable to each other and each of which can execute instructions in parallel, comprising the steps of:

sampling execution-trace data for each processor;

estimating processing time in said processor based on said execution-trace data sampled for each processor; and performing simulation of said MP system based on said processing time estimated for each processor to evaluate the performance of said MP system based on the result of the simulation.

2. An MP system-performance evaluating method as claimed in claim 1, wherein said processing time is calculated by trace-driven simulation based on said execution-trace data sampled for each processor.

3. An MP system-performance evaluation method as claimed in claim 1, wherein said processing time is estimated as a plurality of time intervals, a sum of said time intervals being equal to an interval between time when a data-access instruction for commanding data access occurs and time when the next data-access instruction occurs in the case where communication time required for said data access is assumed to be 0.

4. An MP system-performance evaluation method as claimed in claim 2, wherein said processing time is estimated as a plurality of time intervals, a sum of said time intervals being equal to an interval between time when a data-access instruction for commanding data access occurs and time when the next data-access instruction occurs in the case where communication time required for said data access is assumed to be 0.

5. An MP system-performance evaluation method as claimed in claim 3, wherein said plurality of time intervals comprise:

an estimate of a first time interval I1 from time when said data-access instruction occurs to time when dependency occurs between said data-access instruction and a processing instruction for commanding to process in said processor; and an estimate of a second time interval I2 from time when dependency occurs between said data-access instruction and said processing instruction to time when the next data-access instruction occurs.

6. An MP system-performance evaluation method as claimed in claim 4, wherein said plurality of time intervals comprise:

an estimate of a first time interval I1 from time when said data-access instruction occurs to time when dependency occurs between said data-access instruction and a processing instruction for commanding to process in said processor; and an estimate of a second time interval I2 from time when dependency occurs between said data-access instruction and said processing instruction to time when the next data-access instruction occurs.

7. An MP system-performance evaluation method as claimed in claim 5, wherein actual communication time required for said data access is calculated by the following expression based on said first and second time intervals I1 and I2, when NL is given as said communication time required for said data access in simulation of said MP system:

$$\max(NL, I1)+I2$$

8. An MP system-performance evaluation method as claimed in claim 6, wherein actual communication time required for said data access is calculated by the following expression based on said first and second time intervals I1 and I2, when NL is given as said communication time required for said data access in simulation of said MP system:

$$\max(NL, I1)+I2$$

9. An MP system-performance evaluation method as claimed in claim 7, wherein in simulation of said MP system, time when the next data-access instruction occurs is calculated on the basis of said actual communication time.

10. An MP system-performance evaluation method as claimed in claim 8, wherein in simulation of said MP system, time when the next data-access instruction occurs is calculated on the basis of said actual communication time.

11. An apparatus for evaluating performance of an MP system that comprises a plurality of processors each of which can execute instructions in parallel and which are interconnected so as to be communicable with each other, comprising:

a trace-data sampling part for sampling execution trace data for each processor;

a trace-data conversion part for converting said execution-trace data sampled for each processor by said trace-data sampling part, thus estimating processing time in said processor; and a simulation part for simulating said MP system based on said processing time estimated for each processor by said trace-data conversion part, in order to evaluate the performance of said MP system.

12. An MP system-performance evaluation apparatus as claimed in claim 11, wherein said trace-data conversion part is configured as a simulator which calculates said processing time by converting said execution-trace data sampled for each processor by trace-driven simulation.

13. An MP system-performance evaluation apparatus as claimed in claim 11, wherein said trace-data conversion part estimates said processing time as a plurality of time intervals, a sum of said time intervals being equal to an interval between time when a data-access instruction for commanding data access occurs and time when the next data-access instruction occurs in the case where communication time required for said data access is assumed to be 0.

14. An MP system-performance evaluation apparatus as claimed in claim 12, wherein said trace-data conversion part estimates said processing time as a plurality of time intervals, a sum of said time intervals being equal to an interval between time when the data-access instruction for commanding data access occurs and time when a next data-access instruction occurs in the case where communication time required for said data access is assumed to be 0.

15. An MP system-performance evaluation apparatus as claimed in claim 13, wherein said trace-data conversion part estimates as said plurality of time intervals:

a first time interval I1 from time when said data-access instruction occurs to time when dependency occurs between said data-access instruction and a processing instruction for commanding to process in the processor; and a second time interval I2 from time when dependency occurs between said data-access instruction and said processing instruction to time when the next data-access instruction occurs.

16. An MP system-performance evaluation apparatus as claimed in claim 14, wherein said trace-data conversion part estimates as said plurality of time intervals:

a first time interval I1 from time when said data-access instruction occurs to time when dependency occurs between said data-access instruction and a processing instruction for commanding to process in the processor; and a second time interval I2 from time when dependency occurs between said data-access instruction and said processing instruction to time when the next data-access instruction occurs.

17. An MP system-performance evaluation apparatus as claimed in claim 15, wherein said simulation part calculates actual communication time required for said data access based on time NL given as said communication time required for said data access and said first and second time intervals I1 and I2 by using the following expression:

$$\max(NL, I1)+I2$$

18. An MP system-performance evaluation apparatus as claimed in claim 16, wherein said simulation part calculates actual communication time required for said data access based on time NL given as said communication time required for said data access and said first and second time intervals I1 and I2 by using the following expression:

$$\max(NL, I1)+I2$$

19. An MP system-performance evaluation apparatus as claimed in claim 17, wherein said simulation part calculates time when the next data-access instruction occurs based on said actual communication time.

20. An MP system-performance evaluation apparatus as claimed in claim 18, wherein said simulation part calculates time when the next data-access instruction occurs based on said actual communication time.

21. A memory medium which stores a performance-evaluation program for evaluating, by a computer, performance of an MP system that comprises a plurality of processors each of which can execute instructions in parallel and which are interconnected so as to be communicable to each other, wherein said performance-evaluation program permits said computer to act as:

trace-data sampling means for sampling execution trace data for each processor;

trace-data conversion means for converting said execution-trace data sampled for each processor by said trace-data sampling means, thus estimating processing time in said processor; and simulation means for simulating said MP system based on said processing time estimated for each processor by said trace-data conversion means, in order to evaluate the performance of said MP system.

22. A memory medium which stores MP system-performance evaluation program as claimed in claim 21, wherein said performance-evaluation program permits said computer to act as said simulator which calculates said processing time by converting said execution-trace data sampled for each processor by use of trace-driven simulation, in order to permit said computer to act as said trace-data conversion means.

23. A storage medium which stores MP system-performance evaluation program as claimed in claim 21, wherein said performance-evaluation program permits said trace-data conversion means to act in such a way as to estimate said processing time as a plurality of time intervals, a sum of said time intervals being equal to an interval between time when a data-access instruction for commanding data access occurs and time when the next data-access instruction occurs in the case where communication time required for said data access is assumed to be 0.

24. A storage medium which stores MP system-performance evaluation program as claimed in claim 22, wherein said performance-evaluation program permits said trace-data conversion means to act in such a way as to estimate said processing time as a plurality of time intervals, a sum of said time intervals being equal to an interval between time when a data-access instruction for commanding data access occurs and time when the next data-access instruction occurs in the case where when communication time required for said data access is assumed to be 0.

25. A memory medium which stores MP system-performance evaluation program as claimed in 23, wherein said performance-evaluation program permits said trace-data conversion means to act in such a way as to estimate said plurality of time intervals:

a first time interval I1 from time when said data-access instruction occurs to time when dependency occurs between said data-access instruction and a processing instruction for commanding to process in the processor; and a second time interval I2 from time when dependency occurs between said data-access instruction and said processing instruction to time when the next data-access instruction occurs.

26. A memory medium which stores MP system-performance evaluation program as claimed in 24, wherein said performance-evaluation program permits said trace-data conversion means to act in such a way as to estimate said plurality of time intervals:

a first time interval I1 from time when said data-access instruction occurs to time when dependency occurs between said data-access instruction and a processing instruction for commanding to process in the processor; and a second time interval I2 from time when dependency occurs between said data-access instruction and said processing instruction to time when the next data-access instruction occurs.

27. A memory medium which stores MP system-performance evaluation program as claimed in claim 25, wherein said performance-evaluation program permits said simulation means to act in such a way as to calculate actual communication time required for said data access by the following expression based on time NL given as said communication time required for said data access and said first and second time intervals I1 and I2:

$$\max(NL, I1)+I2$$

28. A memory medium which stores MP system-performance evaluation program as claimed in claim 26, wherein said performance-evaluation program permits said simulation means to act in such a way as to calculate actual communication time required for said data access by the following expression based on time NL given as said communication time required for said data access and said first and second time intervals I1 and I2:

$$\max(NL, I1)+I2$$

29. A memory medium which stores MP system-performance evaluation program as claimed in claim 27, wherein said performance-evaluation program permits said simulation means to act in such a way as to calculate time when the next data-access instruction occurs, based on said actual communication time.

30. A memory medium which stores MP system-performance evaluation program as claimed in claim 28, wherein said performance-evaluation program permits said simulation means to act in such a way as to calculate time when the next data-access instruction occurs, based on said actual communication time.

* * * * *

UNITED STATES PATENT AND TRADEMARK OFFICE
CERTIFICATE OF CORRECTION

PATENT NO.    : 6,038,391
DATED         : March 14, 2000
INVENTOR(S)   : Motoyuki KAWABA It is certified that [an/error[s]] appears in the above-identified patent and that said Letters Patent is hereby corrected as shown below:

Column 15, Line 2, insert -- as -- after "estimate"

Signed and Sealed this

Twenty-fourth Day of April, 2001

Attest:

NICHOLAS P. GODICI

Attesting Officer        Acting Director of the United States Patent and Trademark Office